(No Model.)

L. DRESCHER.
GALVANIC BATTERY CELL.

No. 350,621.   Patented Oct. 12, 1886.

Attest:
John A. Ellis
A. B. Moore

Inventor:
Luis Drescher
By David A. Burr
Atty.

UNITED STATES PATENT OFFICE.

LUIS DRESCHER, OF NEW YORK, N. Y.

GALVANIC-BATTERY CELL.

SPECIFICATION forming part of Letters Patent No. 350,621, dated October 12, 1886.

Application filed November 21, 1885. Serial No. 183,484. (No model.)

*To all whom it may concern:*

Be it known that I, LUIS DRESCHER, of the city, county, and State of New York, have invented a new and useful Improvement in Galvanic Battery Cells; and I do hereby declare that the following is a full and exact description thereof, reference being had to the accompanying drawings, and to the letters of reference marked thereon, making a part of this specification.

My invention relates to a galvanic cell for electro magnetic machines, and has for its object to reduce the cost of its manufacture and simplify its construction, so that all its parts may be easily taken asunder for cleansing or repair and remounted again without the use of tools.

Figure 1:
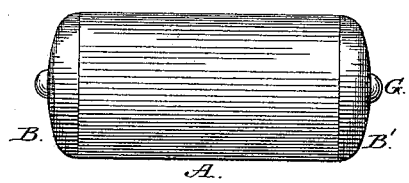
Figure 2:
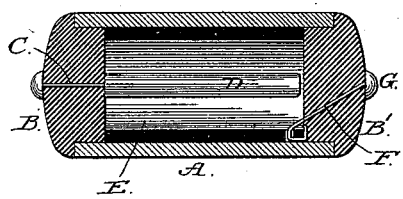

In the accompanying drawings, Figure 1 is an elevation of my improved cell; Fig. 2, a central longitudinal section thereof, and Fig. 3, a similar section illustrating a modification in its construction.

My improved cell is constructed of an outer cylinder, A, open at both ends and made, preferably, of hard rubber, but which may be of glass or other suitable material. Its open ends are closed by plugs or stoppers B B', of soft rubber. A pin, C, having a threaded end, is inserted centrally through one of these stoppers, so as to project from its inner face, and the positive or zinc element D of the cell is secured thereto by screwing it upon the end of the pin. The outer end of the pin is made with a wide head, to serve as an electrode or contact-point, by means of which an electrical connection may be readily made with the positive pole of the battery. A cylinder of carbon, E, is made fast to the inner face of the opposite stopper, B', by means of a platinum wire, F, made fast to the edge of the cylinder and led diagonally through the plug from a point on its inner face near to its outer edge to the center of its outer face, where it is made fast to a central button or plate, G, by which the negative or carbon element may be readily connected with an electrical conductor.

The cell is made ready for use by inserting one of the stoppers, B, in one end of the cylindrical case A, and, after filling the cylinder with a solution of bisulphate of mercury or other suitable exciting fluid or compound, closing the opposite end with the second stopper, B'. The zinc rod D is thereby encircled within the cell by the carbon cylinder E, in form for efficient action.

Figure 3:
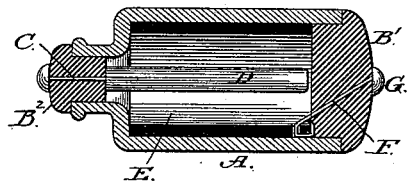

For the sake of greater economy in the construction of the cell, the open end thereof, at which the positive element is introduced, may be contracted, as shown in Fig. 3, so as to admit of being closed by a much smaller plug of rubber, B², the attachment of the zinc rod D being made in manner as above described.

By making the opening for the insertion of the carbon element into the cell of the full diameter of the cell, I am enabled to introduce therein a cylinder of carbon, which may be readily secured to a rubber plug for closing said opening at far less cost than is required when the carbon must needs be introduced into the cell in the process of its manufacture, while the case for the cell admits also of being produced at less cost.

I am aware that galvanic-battery cells have heretofore been constructed of a cylinder of non-conducting material, closed at each end by means of cap-plates screwing over or into said ends; but with these cap-plates of hard material forming a threaded joint with the cylinder there is difficulty in making a tight joint. I am also aware that cells have been constructed, open at one end only, having a carbon cup made fast within the cell, and a zinc rod made fast to a rubber stopper closing its open end, to project into the carbon cup. My invention differs from these, and is novel and peculiar in that it is constructed of a cylinder open at both ends and closed by stoppers of soft rubber to make a tight joint, one of which carries a carbon cylinder and the other a zinc rod or plate projecting therefrom, so that when each plug is properly inserted in the end of the outer cylinder to close it the carbon cylinder will be made to encircle and inclose concentrically the zinc rod or plate. By this means the zinc and carbon elements are brought into the most effective possible relation to each other; the largest possible surface of each is presented to the exciting-fluid; the cell is reduced to the simplest form, admitting of being readily resolved into three separate pieces for cleansing or renewal, and perfectly-tight joints are obtained when the cell is closed.

I claim as my invention—

1. The combination of the non-conducting cylinder A, open at both ends, the soft-rubber stoppers B B', fitted to said ends, the zinc rod D, secured to project from one of the stoppers, B, and the carbon cylinder E, secured to project from the opposite stopper, B', whereby the zinc rod is encircled by the carbon cylinder when the two stoppers are both inserted within the cylinder A, substantially in the manner and for the purpose herein set forth.

2. The combination, with a rubber stopper closing the open end of a battery-cell, of a cylinder of carbon united to the stopper by a platinum wire carried through the rubber from one edge of the cylinder to a central plate or button on the opposite face of the stopper, substantially in the manner and for the purpose herein set forth.

In testimony whereof I have signed my name to this specification in the presence of two subscribing witnesses.

LUIS DRESCHER.

Witnesses:
JOHN A. ELLIS,
A. B. MOORE.